Aug. 6, 1929.                K. ONO                1,723,557
ARTIFICIAL FISH BAIT
Filed June 25, 1928
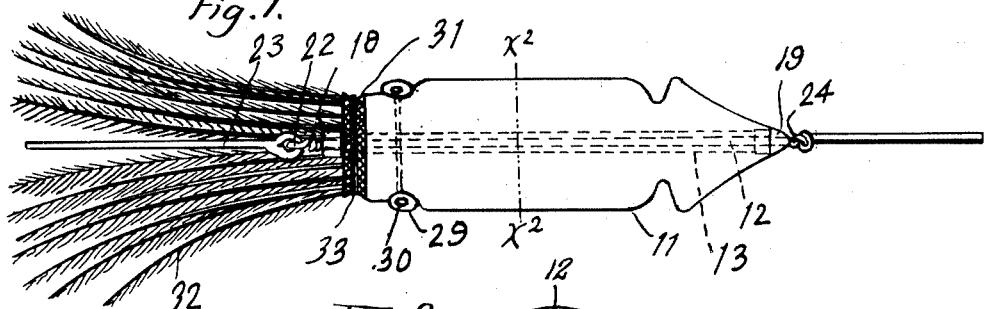
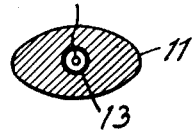
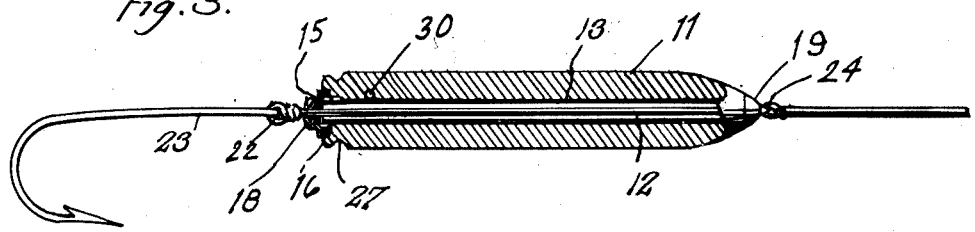
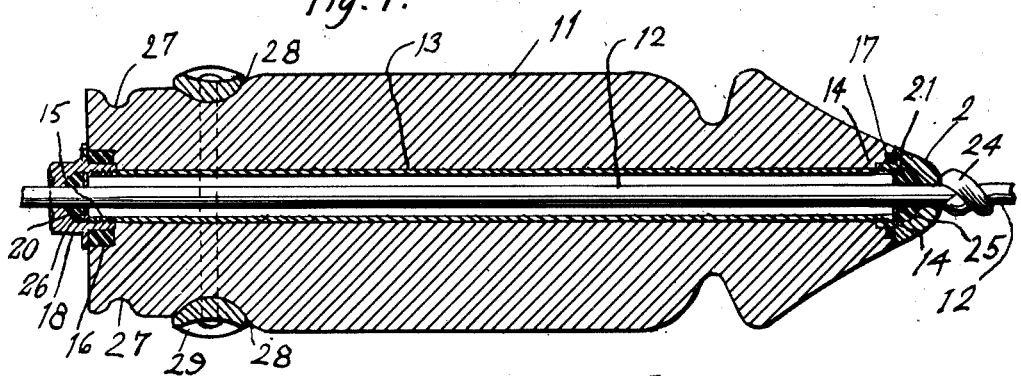
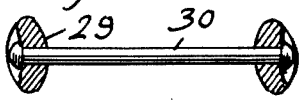
INVENTOR:
KYUJIRO ONO.
BY ATTY:

Patented Aug. 6, 1929.

1,723,557

UNITED STATES PATENT OFFICE.

KYUJIRO ONO, OF LOS ANGELES, CALIFORNIA.

ARTIFICIAL FISH BAIT.

Application filed June 25, 1928. Serial No. 288,100.

This invention relates to an improved fish bait, and has for its objects to provide an improved device of this character, to provide an attractive bait, a combined bait and hook, a fish-catching device that is not easily broken and injured, and to provide artificial bait or lure that avoids use of natural bait.

The drawing illustrates a preferred form of the invention, but it is to be understood that minor changes, alterations and modifications may be made without departing from the spirit of the invention. The bait is adapted for catching large fish, such as tuna, albacore, and others.

In the drawings, Figure 1 is a top plan view of artificial bait constructed in accordance with this invention. Fig. 2 is a cross-section on line $X^2-X^2$, of Fig. 1. Fig. 3 is a longitudinal sectional view. Fig. 4 is an enlarged plan and sectional view. Fig. 5 is an enlarged detail view of the eye elements.

Referring to the drawings in detail, the body 11 is formed similar to a cuttle fish, and may be made of metal, glass, reed, horn, bone, or suitable material. A shaft 12, of heavy wire, extends within a tube 13, disposed longitudinally in the body. The tube has threaded ends 14 and 15. A rubber gasket 16, on one end of the body, and rubber gasket 17, on the opposite end, are, respectively, pressed inwardly by a nut 18, and a cap 19. The nut and cap are respectively, provided with packing 20 and 21, thereby excluding any water from the interior, and preventing bubbles. Shaft 12, terminates in a loop 22, to which is secured a fish hook 23. Adjacent to the cap 19, the shaft is tied into a knot 24, securing the cap in position. Cap 19 and nut 18 have screw connection with tube 13. Washers 25 and 26, retain the packing in position. Body 11 has a groove 27 and cavities 28. The eye elements 29, made preferably from abelone shell, or a shiny material, are disposed in cavities 28, and are connected by a tie-wire 30, forming the pupil of the eyes. I provide a cloth fabric cap 31, covering the end of the body adjacent to the hook. Cap 31 has secured thereto a tuft of feathers 32, which extend from the body, and are disposed around hook 23. Cap 31 is secured by a binding wire 33, which binds the cap in groove 27.

From the foregoing description and drawings, it may be seen that I have provided a combined artificial bait and hook, attractive in appearance, durable, efficient, and which is adapted for the taking of relatively large fish, such as tuna, albacore, barracuda, and fish of similar size.

What is claimed is:

1. An artificial fish bait, comprising a body having the form of a cuttle fish, a cap covering the end of the body and forming the head, a binding wire securing the cap to the body, a tuft of feathers secured to the cap and projecting from the body, a hook operatively connected to the body and disposed among the feathers, elements serving as eyes disposed on the body and adjacent to the cap, a tube within the body, a nut having screw connection with the tube and disposed on one end of the body, a cap having screw connection with the tube and disposed on the opposite end of the body, and a wire shaft extending through the tube, the nut and the cap, and having a connection with the hook, and having a knot on the opposite end adjacent to the metal cap.

2. An artificial fish bait, comprising a body having a longitudinal bore, a tube extending through the bore, a heavy wire shaft extending through the tube and having a loop on one end and a knot on the opposite end, a nut on one end of the body having screw connection with the tube, packing disposed in said nut, a metal cap having a screw connection with the tube on the opposite end, packing disposed in the metal cap, the said wire shaft extending through the nut and metal cap and the packing therein, gaskets at the end of the body and between the body and the nut and metal cap, a fish hook secured to the loop end of the wire shaft, a fabric cap covering the hook end of the body, feathers secured to the fabric cap, eye-elements disposed on opposite sides of the body, and a tie-wire connecting the eye-elements, said eye-elements being disposed adjacent to the fabric cap.

In testimony whereof, I hereunto affix my signature.

KYUJIRO ONO.